United States Patent
Arce et al.

(10) Patent No.: US 10,152,663 B2
(45) Date of Patent: Dec. 11, 2018

(54) METHOD TO STORE A SECRET QR CODE INTO A COLORED SECURE QR CODE

(71) Applicants: Gonzalo R. Arce, Newark, DE (US); Gonzalo Garateguy, Framingham, MA (US); Sean Xiaolu Wang, Wilmington, DE (US); Daniel L. Lau, Lexington, KY (US)

(72) Inventors: Gonzalo R. Arce, Newark, DE (US); Gonzalo Garateguy, Framingham, MA (US); Sean Xiaolu Wang, Wilmington, DE (US); Daniel L. Lau, Lexington, KY (US)

(73) Assignee: Graphiclead LLC, Newark ( * ) Notice: Subject to any disclaimer, the term of this patent is extended or adjusted under 35 U.S.C. 154(b) by 65 days.

(21) Appl. No.: 15/259,460

(22) Filed: Sep. 8, 2016

(65) Prior Publication Data
US 2017/0076127 A1    Mar. 16, 2017

Related U.S. Application Data

(60) Provisional application No. 62/217,155, filed on Sep. 11, 2015.

(51) Int. Cl.
G06K 7/10    (2006.01)
G06K 19/06   (2006.01)

(52) U.S. Cl.
CPC .............................. *G06K 19/06056* (2013.01)

(58) Field of Classification Search
CPC .. G06K 7/1417; G06K 7/1439; G06K 7/1447; G06K 19/06046; G06K 19/06103; G06K 19/06112; G06K 19/0614
See application file for complete search history.

(56) References Cited

U.S. PATENT DOCUMENTS

| 7,950,589 B2 * | 5/2011 | Oouchi ................... G06F 11/08 235/462.1 |
| 8,144,922 B2 | 3/2012 | Kawabe et al. |
| RE44,139 E * | 4/2013 | Cheong ..................... G06T 9/00 235/494 |
| 8,851,392 B2 | 10/2014 | Shinotami et al. |
| 8,948,445 B2 * | 2/2015 | Mow ..................... G06T 1/0021 382/100 |
| 9,697,447 B2 * | 7/2017 | Schory ............. G06K 19/06103 |
| 2010/0195834 A1 * | 8/2010 | Amagai ............. H04N 1/32133 380/277 |

(Continued)

*Primary Examiner* — Thien M Le
*Assistant Examiner* — April Taylor

(57) ABSTRACT

The present invention embodies a technique, referred to as Secure QR Codes, which not only provides aesthetically enhanced QR codes but also allows for security. It can embed a standard black and white QR code, referred to as a public QR code, and a secret QR code, both into a secure QR code. The secure QR code produced is composed of colored cells. The public black and white QR code must first be, either aesthetically enhanced into an enhanced colored QR code, or transformed into a colored QR code with cells of uniform color obtained by transforming each of the black and white cells of the public QR code into cells that takes a color from a subset of possible colors, such that the luminance of each colored cell approximates accurately the black or white luminance values of the public QR code.

24 Claims, 6 Drawing Sheets

(56) References Cited

U.S. PATENT DOCUMENTS

| | | | |
|---|---|---|---|
| 2013/0021364 A1* | 1/2013 | Azuma | G06K 19/06103 345/589 |
| 2013/0026241 A1 | 1/2013 | Sakahashi et al. | |
| 2013/0112760 A1 | 5/2013 | Schory et al. | |
| 2014/0119647 A1* | 5/2014 | Cheong | G06K 9/18 382/166 |
| 2014/0144996 A1 | 5/2014 | Friedman et al. | |
| 2014/0263666 A1* | 9/2014 | Prince | G06K 19/06037 235/494 |
| 2015/0324946 A1 | 11/2015 | Arce et al. | |
| 2016/0342875 A1* | 11/2016 | Annamalai | G06K 19/06103 |
| 2017/0357884 A1* | 12/2017 | Friedman | G06K 19/06037 |

* cited by examiner

METHOD TO STORE A SECRET QR CODE INTO A COLORED SECURE QR CODE

REFERENCE TO RELATED APPLICATION

This application claims inventions which were disclosed in Provisional Patent Application No. 62/217,155, filed Sep. 11, 2015, entitled "METHOD TO STORE A SECRET QR CODE INTO A COLOR QR CODE". The benefit under 35 USC § 119(e) of the above mentioned United States Provisional Application is hereby claimed, and the aforementioned application is hereby incorporated herein by reference.

FIELD OF THE INVENTION

This invention relates to a method to store a secret quick response (QR) code into a colored secure QR code.

BACKGROUND OF THE INVENTION

Quick response (QR) codes have rapidly emerged as a widely used inventory tracking and identification method in transport, manufacturing, and retail industries. Their popularity is due to the proliferation of smart phones, their capability of accessing on line resources as well as its high storage capacity and speed of decoding. QR codes are used in a variety of applications, such as accessing web sites, downloading personal card information, posting information, social networks, initiating phone calls, reproducing videos or opening text documents. This versatility makes them a valuable tool in any industry that seeks to engage mobile users from printed materials. The aesthetic appearance of QR codes has received considerable attention recently due to their use in advertising, billboards, and brand identification. The main challenge of any embedding method is that they should result in codes that are decodable by standard applications, yet produce little distortion in the embedded image.

U.S. Patent application 20150324946 to Arce et al. discloses a method to aesthetically enhance QR codes which uses convex optimization to minimize a visual distortion metric subject to a constraint in the probability of correct QR decoding. The algorithm can be used to embed any color, or black and white image/graphic, into a standard QR code. It provides full area coverage, all with bounded probability of error.

U.S. Pat. No. 8,144,922 to Kawabe discloses a method in which a two-dimensional code that represents information by means of a cell dot distribution pattern, formed by having a plurality of colored cells and a logo mark, are superimposed.

U.S. Pat. No. 8,851,392 to Shinotami discloses an apparatus comprising display control unit which displays image-added two-dimensional codes in which a two-dimensional code presenting given information is superimposed on a first given image to show at least a portion of the two-dimensional code within a region where the first given image is shown U.S. Patent application 20130112760 to Schory discloses systems and methods for the automated generation of QR codes with embedded images therein are provided. The QR code has an active, machine-readable portion and a background portion. An example system comprises an image identification module to identify a human-readable image.

U.S. Patent application 20130026241 to Sakahashi discloses a service, and a system, applications and an associated ecosystem for the consistent and reliable production, creation, generation, management and utilization of two-dimensional (2D') barcodes (Codes') featuring embedded Images, designating the alignment position and alignment size of the embedding Images in 2D Codes and enabling the corresponding outputted Code files by the Device System to be downloaded and or showcased digitally U.S. Patent application 20140144996 to Friedman discloses a method of generating a readable matrix code image encoding a message based on an input image and a readable matrix coding specification, comprising: calculating function areas readable to comply with a function patterns specification; determining an extent of free cells and derived cells according to a code word specification; calculating decode input values for free cells such that the appearance of the free cells compared to respective areas of the input image complies with a visual perceptual similarity criterion.

SUMMARY OF THE INVENTION

The present invention embodies a technique, referred to as Secure QR Codes, which not only provides aesthetically enhanced QR codes but also allows for security. It can embed a standard black and white QR code, referred to as a public QR code, and a secret QR code, both into a secure QR code. The secure QR code produced is composed of colored cells. The public black and white QR code must first be, either aesthetically enhanced into an enhanced colored QR code, or transformed into a colored QR code with cells of uniform color obtained by transforming each of the black and white cells of the public QR code into cells that takes a color from a subset of possible colors, such that the luminance of each colored cell approximates accurately the black or white luminance values of the public QR code.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
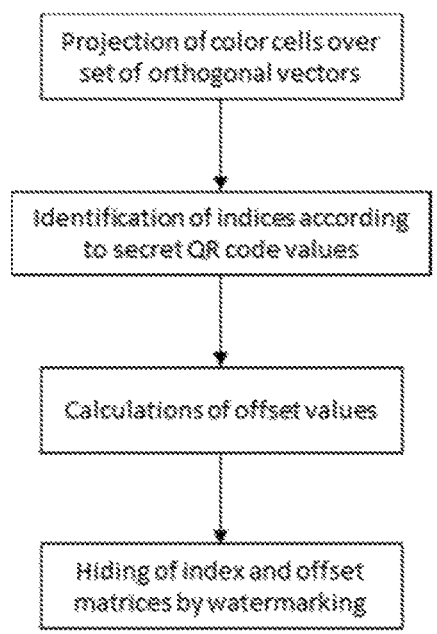
FIG. 1 illustrates the steps of encoding the secret QR code into the color QR code.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The method according to the subject embodies a technique, referred to as Secure QR Codes, which not only provide aesthetically enhanced QR codes but it also allows for security as well. It can embed a standard black and white QR code, referred to as a public QR code, and a secret QR code, both into a secure QR code. The secure QR code produced is composed of colored cells. The public black and white QR code must first be, either aesthetically enhanced into an enhanced colored QR code with techniques such as disclosed in U.S. Patent application 20150324946, which is hereby incorporated by reference, or transformed into a colored QR code with cells of uniform color obtained by transforming each of the black and white cells of the public QR code into cells that takes a color from a subset of possible colors, such that the luminance of each colored cell approximates accurately the black or white luminance values of the public QR code.

The secret QR code is embedded into the secure QR code in such manner that a standard QR code reader can extract the public QR code upon scanning the secure QR code, but not the secret QR code. The secret QR code is thus hidden in the secure QR code and cannot be retrieved unless a key is available. The information stored in the secret QR code can also be secured cryptographically.

Decoding of the secret QR code requires a standard QR code scanner with enhanced software, as well as knowledge of the secure encoding keys. The strategy to merge the information of the secret QR code with the public color QR code to produce the secure QR code relies on the fact that standard QR decoders work with grayscale images, allowing the use the color information orthogonal to the luminance vector direction to encode the cell values of the secret QR code.

The secret QR code information is indirectly encoded onto a set of predefined directions orthogonal to the direction of luminance vector in the RGB color space. According to the values of the secret QR code cells, one of the vectors in the predefine set of orthogonal vectors is selected for the cell of the secret QR code. A secondary matrix is also formed containing the index information. The index information is later hidden into the secure QR code using a watermarking technique and thus it is available at the decoder. The index information can also be transmitted on a separate channel to the decoder in a secure manner. The vector index information, for instance, can be incorporated into the secure QR code by means of special inks which are only visible in the infrared or ultraviolet spectrum. This further increases the security and difficulty of counterfeiting.

The public QR code is obtained by scanning the secure color QR code with a standard QR reader. If in addition, the index information is made available to the scanner, the secret QR code can also be reconstructed from the secure QR code. This method permits to ensure the authenticity of the code by the combination of watermarking, or special inks, with the secret information encoded into the secret QR code. The encoding of the secret QR code into the secure QR code is performed in a sequence of steps as described in FIG. 1.

This method permits to ensure the authenticity of the code by combining a watermarking technique with the secret information encoded in the secret QR code which can further contain an encrypted message using for example private/public key schemes.

Encoding Procedure

The encoding of the secret QR code into the color QR code is performed in a sequence of steps as described in FIG. 1.

The inputs required to generate the combined color QR code denoted as Q3 are: a color QR code denoted as Q1, a secret black and white QR code denoted as Q2, and a set of vectors perpendicular to the luminance direction $w_y$=[0.2898 0.5870 0.1140] in the RGB color space. The invention can be extended to other color spaces and their corresponding set of orthogonal vectors in a straightforward manner by anyone skilled in the art.

The set of vectors in the RGB space is centered at the origin, included in the plane perpendicular to $w_y$=[0.2898 0.5870 0.1140] and oriented in such a way that the angle between consecutive vectors equal 2*pi/K with K being the total number of vectors in the set. Generalizations of unequal angles are feasible as well.

This set of vectors is denoted as Vk={v_k, k=1, . . . , K} and stored in memory to be later transmitted through a secure separate channel to the decoder.

In an example implementation, the set can contain K=4 vectors so that their index values can be stored in a 2 bit variable in memory.

In another example implementation the set can contain K=8 vectors such that their index values can be stored in a 3 bit variable in memory.

The particular location of the vectors in the plane can be selected at random as long as they are uniformly, or approximately, distributed in the orthogonal plane of $w_y$.

After the set of vectors is determined, the color QR code image is subdivided into M×N blocks of multiple pixels corresponding to each of the secret QR code cells. For each of this blocks the average intensity in each of the color channels of the color QR code is calculated generating a three dimensional vector denoted as Q1_ij=[R_ij, G_ij, B_ij] and corresponding to the cell with I row index and J column index.

After calculating the set of color vectors Q1_ij=[R_ij, G_ij, B_ij] the angle with respect to the vectors in the set Vk={v_k, k=1, . . . , K} is determined as {alpha_1, . . . , alpha_K} and calculated as $$\mathrm{alpha\_}k = a\cos(<v\_k, Q1\_ij>/\|v\_k\|\|Q1\_ij\|)$$

Finally, the minimum and maximum values of this set of angles are calculated as alpha_min=min(alpha_k) and alpha_max=max(alpha_k) and the corresponding vector indices found as $$k\_\mathrm{max}=k \text{ such that } \mathrm{alpha\_}k=\mathrm{alpha\_max}$$

and $$k\_\mathrm{min}=k \text{ such that } \mathrm{alpha\_}k=\mathrm{alpha\_min}.$$

This process is repeated for each of the M×N code cells and results in matrix M×N indices corresponding to each of the secret QR code cells and denoted as Idx which is stored in the system memory for later use.

The values stored in position (I,J) of the matrix Idx is obtained according to the values of the (I,J) cell in the secret QR code as $$Idx(i, j) = \begin{cases} k_{min} & \text{if } Q2(i, j) = 0 \\ k_{max} & \text{if } Q2(i, j) = 1 \end{cases}$$

In addition to the calculation of the index matrix, a second matrix also of size M×N and denoted by O is determined according to $$O(i,j) = \begin{cases} 1 & \text{if } abs(alpha\_k(i,j)) < 0.5 \text{ and } Q2(i,j) = 1 \\ 0 & \text{if } abs(alpha\_k(i,j)) \geq 0.5 \\ -1 & \text{if } abs(alpha\_k(i,j)) < 0.5 \text{ and } Q2(i,j) = 0 \end{cases}$$

This second matrix is also stored in memory for later use in the process.

In one implementation of the method, each of the values of the matrix Idx are represented in binary notation of and separated into one bit matrices denoted as Idx_1, Idx_2, and Idx_3 when K=3 or Idx_1, Idx_2 when K=2.

After obtaining the binary matrices Idx_1, Idx_2 or Idx_3 and the offset matrix O, these matrices are passed over to the watermarking stage in which each of the (I,J) elements is embedded into the corresponding block of the original QR code by means of a watermarking technique.

Watermarking of Index Matrices

Different watermarking techniques can be employed to hide the index matrices Idx_1, Idx_2, Idx_3 and O into the color QR codes. One example of such techniques is spatial watermarking using Discrete Cosine Transform (DCT) transform. This implementation of the process consists on calculating the DCT transform of the different color channels of each of the sub blocks in the color QR code and replacing a set of coefficients with the corresponding Bit values of one of the matrices Idx_1, Idx_2 and Idx_3.

These values might be previously scrambled according to a private key to improve the secrecy.

After the coefficients are replaced with the binary values, the inverse transform is calculated in each of the blocks and the color QR code image reassembled.

If there only two matrices Idx_1 and Idx_2 they can be watermarked into the R and G channels and the B channel can be used to store the values O.

In the case the there are three matrices Idx_1, Idx_2 and Idx_3 the R, G and B channels are used and in this case the matrix O can be stored in a non-visible channel which is printed using inks reflective only in the infrared or ultraviolet spectrums.

At the end of this process the resulting color QR code is stored in memory and transmitted over suitable channels which can include, a computer network, a physical medium such as printing medium, etching, or LCD screen.

Figure 2:
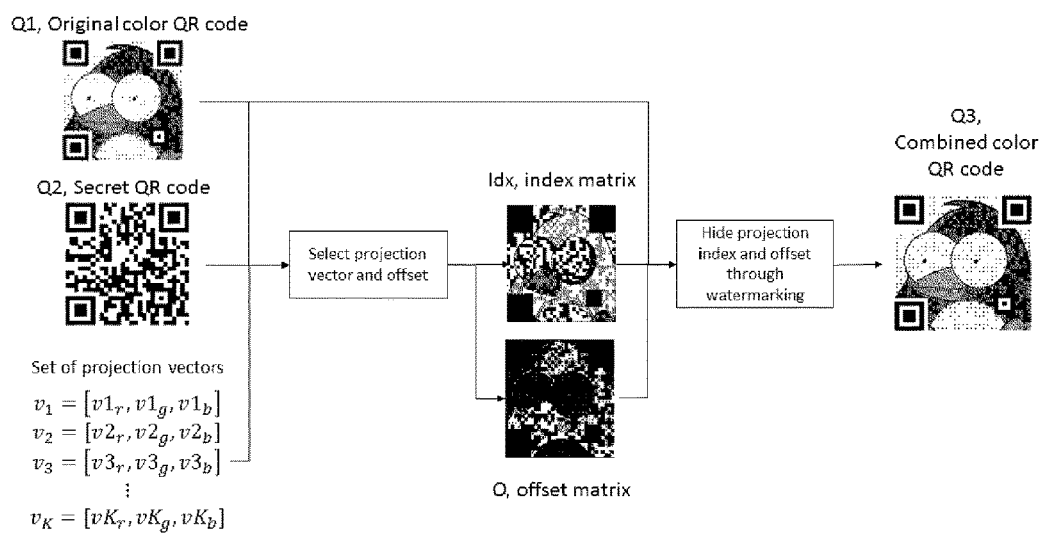
FIG. 2 depicts the encoding steps and intermediate matrices for the case when the public QR code is an aesthetically enhanced color QR code.
Figure 3:
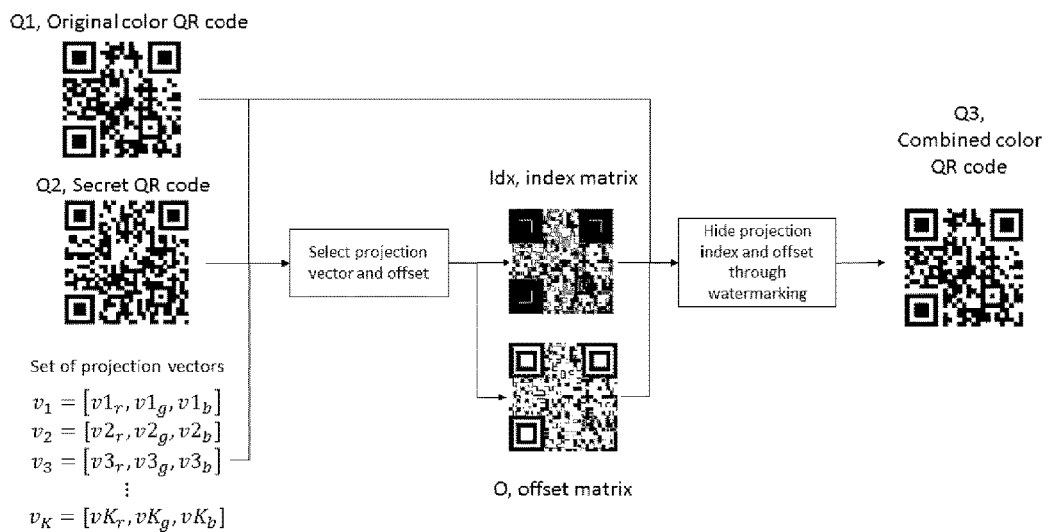
FIG. 3 depicts the process for the case when the public QR code is a color QR code with uniform color cells.

An example of the encoding steps and intermediate matrices for the case when the pubic QR code is a color QR code is depicted in FIG. 2. FIG. 3 depicts the process for the case when the public QR code is color QR code with uniform color cells.

Decoding Process

The decoder receives as inputs, the combined color QR code though a public unreliable channel and the same set of vectors used to generate the index matrices through a separate secure channel.

Figure 4:
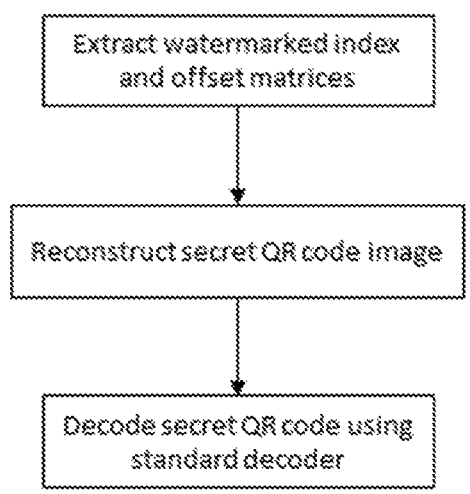
FIG. 4 depicts the procedure to decode the secret QR code.

From the received secured QR code (Q3) two messages can be extracted, if the code is scanned with a regular QR decoder, the public message associated with the original aesthetically enhanced QR code is recovered, but no secret message can be obtained using this regular decoder. The procedure to decode the secret QR code is depicted in FIG. 4.

Extract Watermarked Matrices

To recover the secret message, the first step is to extract both Idx and O matrices by subdividing the received secure QR code image into M×N blocks and calculating the DCT transform on each color layer from which the projection binary matrices Idx_1, Idx_2 and Idx_3 are recovered for the case of K=8 vectors or Idx_1, Idx_2 for the case of K=4. If a fourth non visible channel was used in addition to the R, G and B channel, this image is also captured under special illumination and the third matrix O is recovered in a similar fashion as in the visible color channels. Any image watermarking method can be used to store the index information, not just DCT based methods. If the matrices Idx_1, Idx_2 and Idx_3 were scrambled in the encoding process this process is reversed using a cryptographic key and the matrix Idx containing the original vector indices reassembled.

Reconstruct Secret QR Code Image

Using the indices in each of the elements of the matrix Idx, the corresponding vector in the set Vk is selected and the greyscale value of the secret code calculated as $$Qsecret(i,j) = <v\_Idx(ij), Qblock(i,j)> + O(Ij)$$

Where Qblock is an [R,G,B] vector calculated from the received image Q3 by averaging the color values in each of the color layers.

Decoding Secret QR Code

The obtained grayscale image is the passed to a standard QR decoder which recovers the secret message.

For certain applications this message can be further encrypted so that only a receiver with appropriate cryptographic key can decode it.

Figure 5:
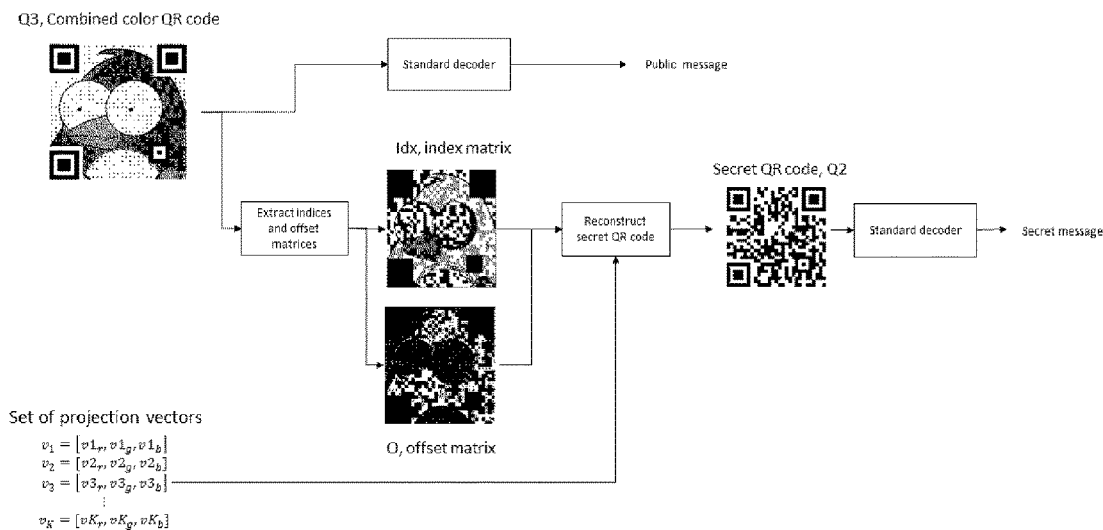
FIG. 5 depicts a diagram of the complete process for the case when the original input image is an embedded color QR code.

A diagram of the complete process for the case when the original input image is an embedded color QR code is depicted in FIG. 5.

Secure QR codes can be used in a number of applications including secure QR code labels for tamper resistant and anti-counterfeit packaging of goods, and parts. These secure labels can be used in final packaging of goods or in securing parts in a manufacturing or assembling supply chain.

Figure 6:
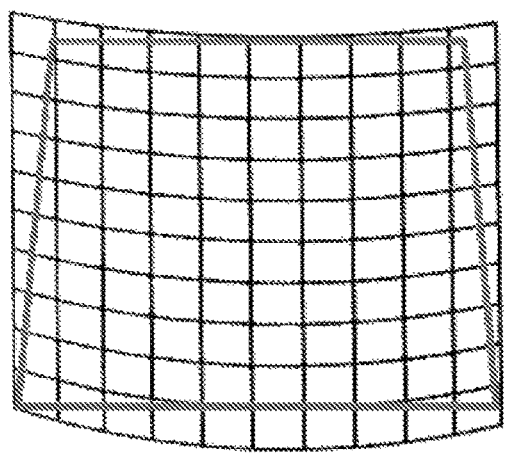
FIG. 6 depicts an example of a distorted shape observed when a squared shape QR code is printed on a conical cup, and the pre-distorted shape that the QR code would have to be stretched to in order for it to appear squared shaped when printed on the conical surface.

Secure QR code labels are such that by copying or peeling-back the label material will cause distortion of the watermarked features carrying the information required for decoding secret QR codes. Finally, secure QR code labels will often be attached to non-planar surfaces, like package edges or cylinders as illustrated in FIG. 6. To this end, the invention includes methods to geometrically predistort the secure QR labels such that when these are attached to the edges of a package, or any non-planar surface, the secure QR code projection onto a standard QR code reader will appear as a non-distorted square code with uniform cells which can then be reliably decoded by a standard QR code reader.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for generating a colored secure QR code comprising a standard visible QR code and a secondary hidden QR code, the method comprising the steps of:
   (a) obtaining a color QR code composed by three color channels (R, G, B), each represented as a matrix with P rows and Q columns, generated from a public message;
   (b) obtaining a secondary black and white QR code represented as matrix with P rows and Q columns, generated from a secret message;
   (c) obtaining a set of K indexed three dimensional vectors, equally spaced in a plane perpendicular to a luminance reference vector $w_y$=[0.2898 0.5870 0.1140], or a luminance reference vector of approximately in the same direction in the RGB color space;
   (d) subdividing each color channel of the color QR code in sub blocks of M rows and N columns depending on the size of QR code cells which are each of the black and white squares in the secondary black and white QR code;
   (e) calculating an average color of the sub blocks in each of the color channels of the color QR code and store its values in a color vector v=[R,G,B];
   (f) performing an inner product of the color vector obtained in step (e) for each of the sub blocks over the set of K indexed three dimensional vectors obtained in step (c);
   (g) identifying two indexes over the set of K indexed three dimensional vectors for each of the sub blocks, the first index corresponding to a maximum projection value which is the maximum value of the inner product performed in step (f) and the second index corresponding to a minimum projection value which is the minimum value of the inner product performed in step (f);
   (h) storing the first index identified in step (g) as the maximum projection if the color of the QR code cell in the secondary black and white QR code is white which is equivalent to a value of 1 for the corresponding sub block or the second index identified in step (g) as the minimum projection if the color of the QR code cell in the secondary black and white QR code is black which is equivalent to a value of 0, wherein the indices are stored for each sub block into a matrix of indices of M rows and N columns;
   (i) finding for each sub block an offset value depending on the maximum or minimum projection values obtained in step (g), wherein if an absolute of value of the projection is less than 0.5 and the value of the secondary black and white QR code is equal to 0 then the offset value is set to −1, if the absolute value of the projection is less than 0.5 and the value of the secondary black and white QR code is equal to 1 then the offset value is set to 1, and if the absolute value of the projection is greater than 0.5 then the offset value is set to 0, wherein the offset value is stored for each sub block into an offset matrix of M rows and N columns;
   (j) calculating a binary representation of each element in the matrix of indices obtained in step (h) and store each of its bits in a different binary matrix, generating a set of binary matrices;
   (k) storing the set of binary matrices obtained in step (j) into different color channels of the color QR code using a watermarking technique;
   (l) storing the offset matrix obtained in step (i) into one of the color channels via the watermarking technique or a different spectral channel by means of special inks reflective in non-visible spectral bands; and
   (m) transmitting the resulting colored secure QR code with the offset and index matrices hidden through a communication channel.

2. The method of claim 1, wherein the set of K indexed three dimensional vectors in step (c) has a total of K=2^n element equally spaced.

3. The method of claim 2, wherein the set of K indexed three dimensional vectors is unequally spaced.

4. The method of claim 1, wherein the set of K indexed three dimensional vectors in step (c) has an arbitrary number of vectors evenly spaced.

5. The method of claim 4, wherein the set of K indexed three dimensional vectors is unequally spaced.

6. The method of claim 1, wherein the set of binary matrices in step (j) are stored in the R, G, and B color channels of the color QR code.

7. The method of claim 1, wherein the watermarking technique consists of applying Discrete Cosine Transform (DCT) which transforms each sub block from the spatial domain to the frequency domain, wherein the frequency components of each sub block are defined as DCT coefficients, wherein some of the DCT coefficients of each sub block are modified depending on the corresponding bit value from the set of binary matrices in step (j).

8. The method of claim 7, wherein the DCT transform is replaced with discrete wavelet transform and the coefficients are stored in the high frequency components of the transform.

9. The method of claim 1, wherein the offset matrix or the set of binary matrices obtained in step (i) and step (j) are printed on special ink reflective in the infrared band of the spectrum.

10. The method of claim 1, wherein the RGB color space is replaced by a different color space, including but not limited to CMY, CMYK, sRGB, or Lab, and the luminance reference vector is modified according to the different color space, and the set of perpendicular vectors are created according to the luminance reference vector in the different color space.

11. The method of claim 1, wherein the offset matrix or the set of binary matrices obtained in step (i) and step (j) are printed on a special ink reflective in the ultraviolet band of the spectrum.

12. The method of claim 1, wherein the resulting colored secure QR code of step (m) is transmitted over a network as digital format.

13. The method of claim 1, wherein the resulting colored secure QR code of step (m) is transmitted via a printing media, which can comprise a paper medium, plastic medium, fabric or other printable surface.

14. A method for decoding the colored secure QR code generated by following the steps in claim 1, the method comprising the steps of:
   (a) receiving the colored secure QR code through a specified channel including but not limited to a digital network or printing media and convert the colored secure QR code into a color matrix with RGB channels stored into memory as matrix of P rows and Q columns;
   (b) receiving by a separate secured channel the set of K indexed three dimensional vectors obtained in step (c) of claim 1 and store the set of K indexed three dimensional vectors in memory for later use;
   (c) sub-dividing the color matrix of P row and Q columns in the sub blocks of M×N size corresponding to the size of the secondary black and white QR code, information which is also obtained via the secondary secure channel;

(d) reversing the watermarking technique described in step (k) of claim 1 to obtain all the set of binary matrices defined in step (j) of claim 1;

(e) determining each element of the matrix of indices corresponding to the sub block from the binary matrices found;

(f) extracting the offset matrix from one of the color channels of the received colored secure QR code or the non-visible spectral band via special illumination;

(g) for each of the sub blocks calculating for each channel an average color value, projecting the average color values in each of the three color channels [R, G, B] over the vector corresponding to the index found in step (e);

(h) adding to the value of the projection obtained in step (g) the offset value corresponding to the sub block obtained in step (f);

(i) storing the value obtained in step (h) into a matrix of size M×N and pass it to a standard QR decoder to extract the secret message stored in the secondary black and white QR code; and (j) passing the received color QR code to the standard QR decoder to extract the public message in the color QR code.

15. The method of claim 14, wherein the watermarking procedure is reversed by calculating the Discrete Cosine Transform (DCT) in each of the sub blocks for each of the color layers and extracting the binary values from a set of pre specified band transmitted to a receiver from a secondary secure channel.

16. The method of claim 14, wherein the watermarking technique is reversed by calculating the inverse discrete wavelet transform and extracting the binary values from a set of pre specified coefficients in the high frequency bands transmitted to a receiver through a secondary secure channel.

17. The method of claim 14, wherein the offset or binary matrices values are obtained by illuminating the colored secure QR code with infrared light and capturing an image with the offset or binary matrices in the infrared band of the spectrum via a special detector sensitive to the infrared band of the spectrum.

18. The method of claim 14, wherein the offset or binary matrices values are obtained by illuminating the colored secure QR code with ultraviolet light and capturing an image with the offset or binary matrices in the ultraviolet band of the spectrum via a special detector sensitive to the ultraviolet band of the spectrum.

19. The method of claim 14, wherein an additional decryption stage is necessary to decode the secret message and the decoding is only possible with an appropriate cryptographic key.

20. The method of claim 1, wherein the colored secure QR code is produced and printed on a label.

21. The method of claim 1, wherein the colored secure QR code is produced and printed on transparent peel-off label that can be attached to a variety of packaging of different materials.

22. The method of claim 1, wherein the colored secure QR code has additional security features, including but not limited to hidden watermarks or special inks, which are distorted by an action of peeling off a QR code label from a packaging, such that the colored secure QR code cannot be read by a special reader.

23. The method of claim 1, wherein the colored secure QR has additional security features, including but not limited to hidden watermarks or special inks, which are distorted by an action of cutting a QR code label from a packaging, such that the colored secure QR code cannot be read by a special reader.

24. The methods of claim 1, wherein the cells of the colored secure QR code are geometrically pre-distorted according to the intended packaging surface, including but not limited to box edges or bottle cylinders, wherein the pre-distorted secure QR code cells are such that when these are attached to any non-planar surface and then projected onto a standard QR code reader, the projected cells will appear as a non-distorted uniform cells of a square QR code which can then be reliably decoded by a standard QR code reader.

* * * * *